US007756401B2

(12) United States Patent
Tseng et al.

(10) Patent No.: US 7,756,401 B2
(45) Date of Patent: Jul. 13, 2010

(54) DIGITAL AUDIO-VIDEO INFORMATION REPRODUCING APPARATUS AND REPRODUCING METHOD FOR REPRODUCING SUBTITLE FILE AND FILE-BASED AUDIO-VIDEO FILE

(75) Inventors: Yong-Lii Tseng, Tainan (TW); Yu-Chi Chen, Hsinchu (TW); Pien-Cheng Chiu, Su-ao Township, Yilan County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 1344 days.

(21) Appl. No.: 11/222,447

(22) Filed: Sep. 7, 2005

(65) Prior Publication Data

US 2006/0251406 A1    Nov. 9, 2006

(30) Foreign Application Priority Data

May 6, 2005   (TW)   ............................... 94114664 A

(51) Int. Cl.
*H04N 5/00* (2006.01)
*H04N 7/26* (2006.01)

(52) U.S. Cl. ...................................... 386/125; 386/112

(58) Field of Classification Search .................. None
See application file for complete search history.

(56) References Cited

U.S. PATENT DOCUMENTS

| 6,553,180 | B1* | 4/2003 | Kikuchi et al. ................. 386/95 |
| 6,877,010 | B2* | 4/2005 | Smith-Semedo et al. .... 707/102 |
| 2005/0038814 | A1* | 2/2005 | Iyengar et al. ........... 707/104.1 |
| 2008/0075431 | A1* | 3/2008 | Moriya et al. ................. 386/95 |

* cited by examiner

*Primary Examiner*—Thai Tran
*Assistant Examiner*—Heather R Jones
(74) *Attorney, Agent, or Firm*—J.C. Patents

(57) ABSTRACT

A digital audio-video information reproducing apparatus and a reproducing method thereof are provided, in which a predetermined time point or a keyword from users is used as a basic for controlling the reproduction of a file-based AV file. If the subtitle is in a bitmap format, the bitmap subtitle is transformed to text contents. If the subtitle is in a text format, the subtitle is directly interpreted. Then, the interpreted/transformed text content is compared with the keyword, so as to interpret a matched time point corresponding to the subtitle, and the matched time point is set as a start or end point for reproducing the AV file. Alternatively, the comparison result may be applied in analyzing a correlation between the AV file and the keyword.

11 Claims, 3 Drawing Sheets

DIGITAL AUDIO-VIDEO INFORMATION REPRODUCING APPARATUS AND REPRODUCING METHOD FOR REPRODUCING SUBTITLE FILE AND FILE-BASED AUDIO-VIDEO FILE

CROSS-REFERENCE TO RELATED APPLICATION

This application claims the priority benefit of Taiwan application serial no. 94114664, filed on May 6, 2005. All disclosure of the Taiwan application is incorporated herein by reference.

BACKGROUND OF THE INVENTION

1. Field of the Invention

The present invention relates to a digital audio-video (AV) reproducing apparatus and a reproducing method thereof, and more particularly, to a digital AV information reproducing apparatus and a reproducing method thereof, in which a file-based AV file can be reproduced from any time point by generating an "AV index".

2. Description of the Related Art

Optical disks are advantageous in large capacity, easy and long time of preservation, low cost, and good data protection, and thus optical disks have become one of the mainstreams of modern storage medium. For example, a digital versatile disk (DVD) containing the AV reproducing information such as video, audio, and subtitle as well as the reproducing control information is one example of the optical disks.

For home entertainment environment, it is very common to use a digital AV information reproducing apparatus (e.g. a DVD player) to reproduce a DVD or a file-based digital AV file (e.g. a digital AV file in a format of MPEG4 (moving picture expert group-4)), such that users can watch the AV content.

FIG. 1 schematically shows a block diagram of a conventional DVD player. Referring to FIG. 1, the conventional DVD player 200 comprises a navigator 210, a de-multiplexer 220, a decoder 230, an audio process unit 240, an audio output unit 250, a video process unit 260, a video output unit 270, a user interface 280, and a controller module 290. Wherein, the controller module 290 provides a reproducing control signal to the navigator 210 based on the signal input by the user, and the navigator 210 reads an AV data from an optical disk 100 based on the reproducing control signal.

The de-multiplexer 220 divides the AV data into audio data, video data, and sub-picture units (SPU). Wherein, the audio data, the video data, and the sub-picture units are fed into an audio decoder 232, a video decoder 234, and a sub-picture decoder 236 of the decoder 230, respectively. More specifically, the sub-picture decoder 236 decodes and generates a subtitle picture as well as reproducing information of the subtitle picture (which includes information of time, position, and color contrast, etc) based on the sub-picture unit. Here, the subtitle picture is generally in a bitmap format.

After the video process unit 260 receives the subtitle picture from the sub-picture decoder 236, the subtitle picture is combined with an image output from the video decoder 234. In addition, the audio decoder 232, the video decoder 234, and the sub-picture decoder 236 determines its output time based on a system clock. In general, the DVD player uses a reproducing time of the video data or the audio data as its control basic. To be noted, the navigator 210 may further receive plug-in subtitle information, such that the subtitle with different language can be displayed on the screen. In addition, the AV data of the optical disk 100 further comprises Line-21 information, which provides the subtitle information. Wherein, the so-called Line-21 information represents the information embedded in Line-21.

When the conventional DVD player is reproducing a DVD movie, it can reproduce the DVD movie from any time point. However, when the conventional DVD player is playing the file-based digital AV file, it can only support simple reproducing function, such as rewind, speed forward, and slow picture, etc, and not able to reproduce the digital AV file from any time point. It is because the file-based digital AV file does not contain system layer information, and thus it is not possible to reproduce the digital AV file from any time point. Accordingly, it brings great inconvenience to the user in reproducing the file-based digital AV file. Furthermore, the subtitle is purely displayed when reproducing the AV file and it cannot be used to improve the user interaction.

Accordingly, it is required to provide a digital AV information reproducing apparatus and a method for controlling the same. Even in reproducing the file-based digital AV file, the digital AV file can be reproduced from any time point by using the subtitle as its control basic.

SUMMARY OF THE INVENTION

Therefore, it is one aspect of the present invention to provide a digital AV information reproducing apparatus for reproducing a file-based digital AV file from any time point.

It is another aspect of the present invention to provide a method for reproducing digital AV information, in which user interaction is achieved by jumping to a picture of a subtitle having "A text or question input by the user" in reproducing the file-based AV file.

In order to achieve aspects mentioned above and others, one embodiment of the present invention provides a digital AV information reproducing apparatus for reproducing a file-based digital AV file. The reproducing apparatus comprises: an instruction interpret unit generating a reproducing signal in response to a user signal; an AV index generation unit for analyzing the AV file and generating an AV index; and a reproducing control unit for receiving the reproducing signal, the AV file, and the AV index. Wherein, when the user signal contains a predetermined time point, the reproducing control unit searches and reproduces a matched part of the AV file corresponding to the predetermined time point based on the AV index and the predetermined time point.

In accordance with a preferred embodiment of the present invention, the reproducing control unit further receives a subtitle file, searches and reproduces a matched part of the subtitle file corresponding to the predetermined time point. In response to the user signal containing a text to be searched, the instruction interpret unit further generates a text identification control signal; and the reproducing control unit interprets the AV file and the subtitle file into an AV stream and a subtitle stream.

In accordance with the preferred embodiment of the present invention, the digital AV information reproducing apparatus further comprises: an AV separator for separating the AV stream into an audio data and a video data; a subtitle interpret unit for interpreting the subtitle stream into either a text content or a picture content; a text interpret unit for interpreting the text content into a text subtitle; a sub-picture decoder for decoding the sub-picture content into a picture subtitle; a text recognition unit for recognizing the picture subtitle and providing a subtitle recognition result; a data comparison unit for comparing the text identification control signal with the text subtitle or the subtitle recognition result and providing a setup signal indicating the comparison result to the reproducing control unit; an audio process module for processing the audio data into an audio output signal; and a video process module for processing the video data and alternative of the text subtitle and the picture subtitle into a video output signal.

In accordance with the preferred embodiment of the present invention, when the setup signal indicates the comparison is matched, the reproducing control unit searches the AV index based on the setup signal in order to search and reproduce a matched part corresponding to the AV file and the subtitle file containing the text to be searched.

In accordance with the preferred embodiment of the present invention, the digital AV information reproducing apparatus further comprises a database for providing a keyword to the data comparison unit. The data comparison unit compares the keyword with the text subtitle or the subtitle recognition result, and sends a setup signal indicating the comparison result back to the reproducing control unit. Wherein, the reproducing control unit controls the video process module to process alternative of the text subtitle and the picture subtitle containing the keyword based on the setup signal indicating a matched comparison.

In order to achieve aspects mentioned above and others, another embodiment of the present invention provides a digital AV information reproducing apparatus for reproducing a subtitle file and a file-based AV file. The reproducing apparatus comprises: a reproducing control unit for separating the AV file and the subtitle file into an AV stream and a subtitle stream; an instruction interpret unit for replying a user signal and generating a text identification control signal and a reproducing signal that is fed into the reproducing control unit; an AV index generation unit for analyzing the AV file and providing an AV index to the reproducing control unit; a subtitle process module for processing the subtitle stream into either a text subtitle or a subtitle recognition result; a data comparison unit for comparing the text identification control signal with the text subtitle or the subtitle recognition result; wherein when the user signal contains a predetermined time point, the reproducing control unit searches and reproduces a matched part of the AV file and the subtitle file corresponding to the predetermined time point based on the AV index and the predetermined time point; and when the user signal contains a text to be searched, the data comparison unit sends a setup signal indicating the comparison result back to the reproducing control unit, and the reproducing control unit searches the AV index based on the setup signal in order to search and reproduce a matched part of the AV file and the subtitle file containing the text to be searched.

In accordance with the preferred embodiment of the present invention, the digital AV information reproducing apparatus further comprises an AV separator for separating the AV stream into an audio data and a video data.

In accordance with the preferred embodiment of the present invention, the subtitle process module comprises: a subtitle interpret unit for interpreting the subtitle stream into either a text content or a sub-picture content; a text interpret unit for interpreting the text content into a text subtitle; a sub-picture decoder for decoding the sub-picture content into a picture subtitle; and a text recognition unit for recognizing the picture subtitle and generating a subtitle recognition result.

In accordance with the preferred embodiment of the present invention, the digital AV information reproducing apparatus further comprises: an audio process module for processing the audio data and generating an audio output signal; and a video process module for processing the video data and alternative of the text subtitle and the picture subtitle and generating a video output signal.

In order to achieve aspects mentioned above and others, the present invention provides a reproducing method for reproducing a subtitle file and a file-based AV file. The reproducing method comprises: generating an AV index by analyzing the AV file; receiving a user signal; and interpreting the user signal. The reproducing method further comprises: when the user signal contains a predetermined time point, searching the AV index based on the predetermined time point, and reproducing a matched part of the AV file and the subtitle file corresponding to the predetermined time point; and when the user signal contains a text to be searched, searching the AV index based on a result of comparing the subtitle file with the text to be searched and reproducing a matched part of the AV file and the subtitle file containing the text to be searched.

In accordance with the preferred embodiment of the present invention, the reproducing method further comprises: entering into a special reproducing mode in which both the audio output and the video output are turned off; interpreting the subtitle file into either a text subtitle or a picture subtitle; comparing the text to be searched with the text subtitle or the picture subtitle; if the comparison is matched, analyzing a matched time point corresponding to the text subtitle or the picture subtitle; and returning to a normal reproducing mode to reproduce the AV file and the subtitle file from that time point.

In the present invention, an AV index is generated after analyzing a file-based digital AV file. Accordingly, the user defined keyword can be used for comparing with the interpreted/recognized subtitle content, and the matched time point of the subtitle can be used as a control basic for reproducing the AV file.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF THE PREFERRED EMBODIMENTS

When reproducing the file-based digital AV file, in order to reproduce the AV file from any time point, it is required to analyze the AV information and offset of the AV file for generating an "AV index" in the early age of reproducing the AV file. The AV index records an offset of the AV file corresponding to a specific time point. It is obvious that the higher capacity of the AV index it has, the more information of time points it can record.

In order to utilize the subtitle as its basic control of reproducing time point, the subtitle must be interpreted into a meaningful text content first. Here, the interpreted text content further includes a start point and an end point of AV file reproducing. In addition, the time to reproduce the subtitle is provided to the digital AV apparatus as its start and end points of the AV reproducing.

In order to interact with the subtitle by users, the subtitle content has to be recognized first. When the subtitle is in a text format, its content is directly interpreted. However, when the subtitle is in a sub-picture format, the sub-picture has to be recognized first. The sub-picture is composed of bitmap and can be converted into a text by an optical character recognition (OCR) module.

Figure 1:
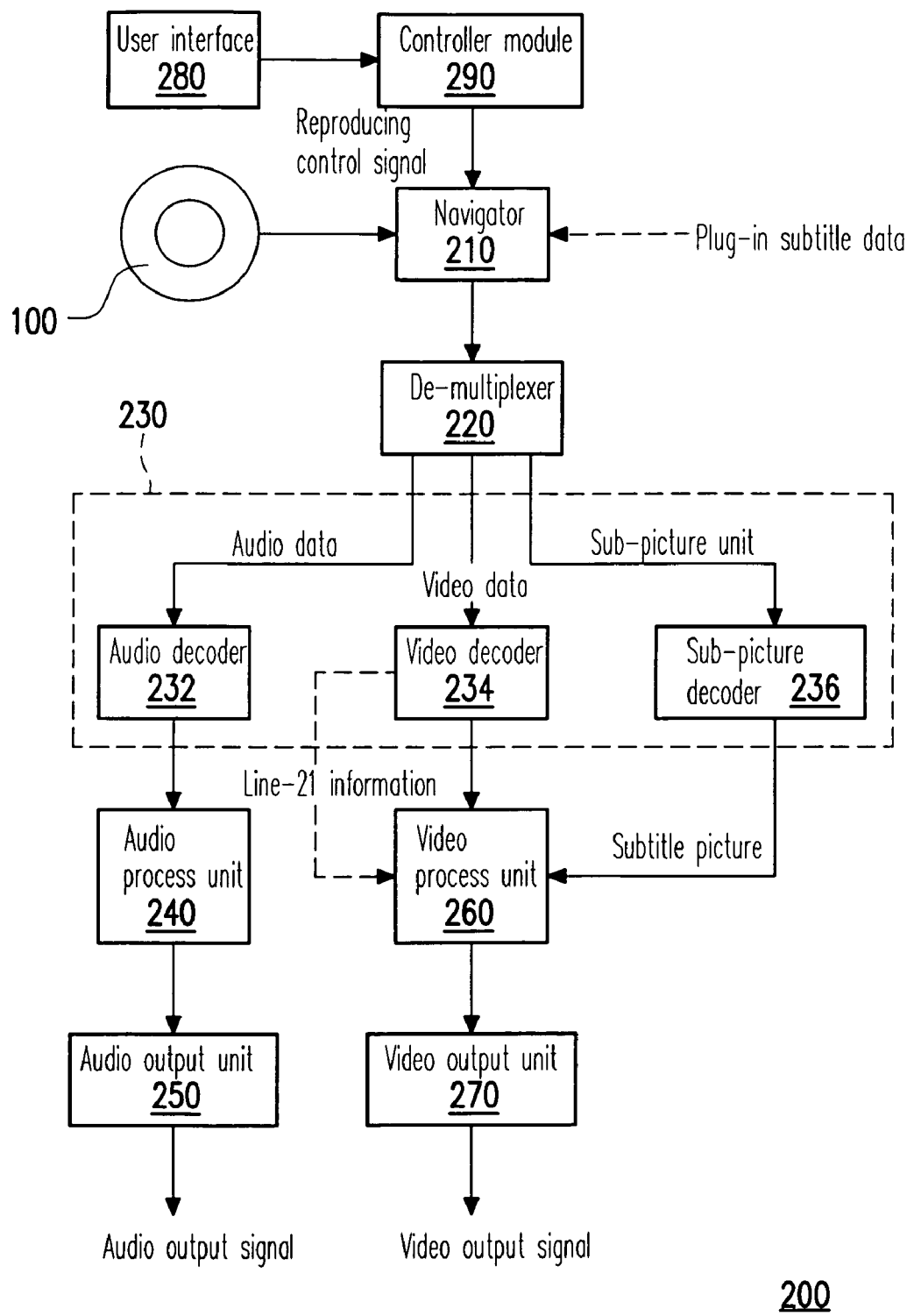
FIG. 1 schematically shows a functional diagram of a conventional optical disk reproducing apparatus.
Figure 2:
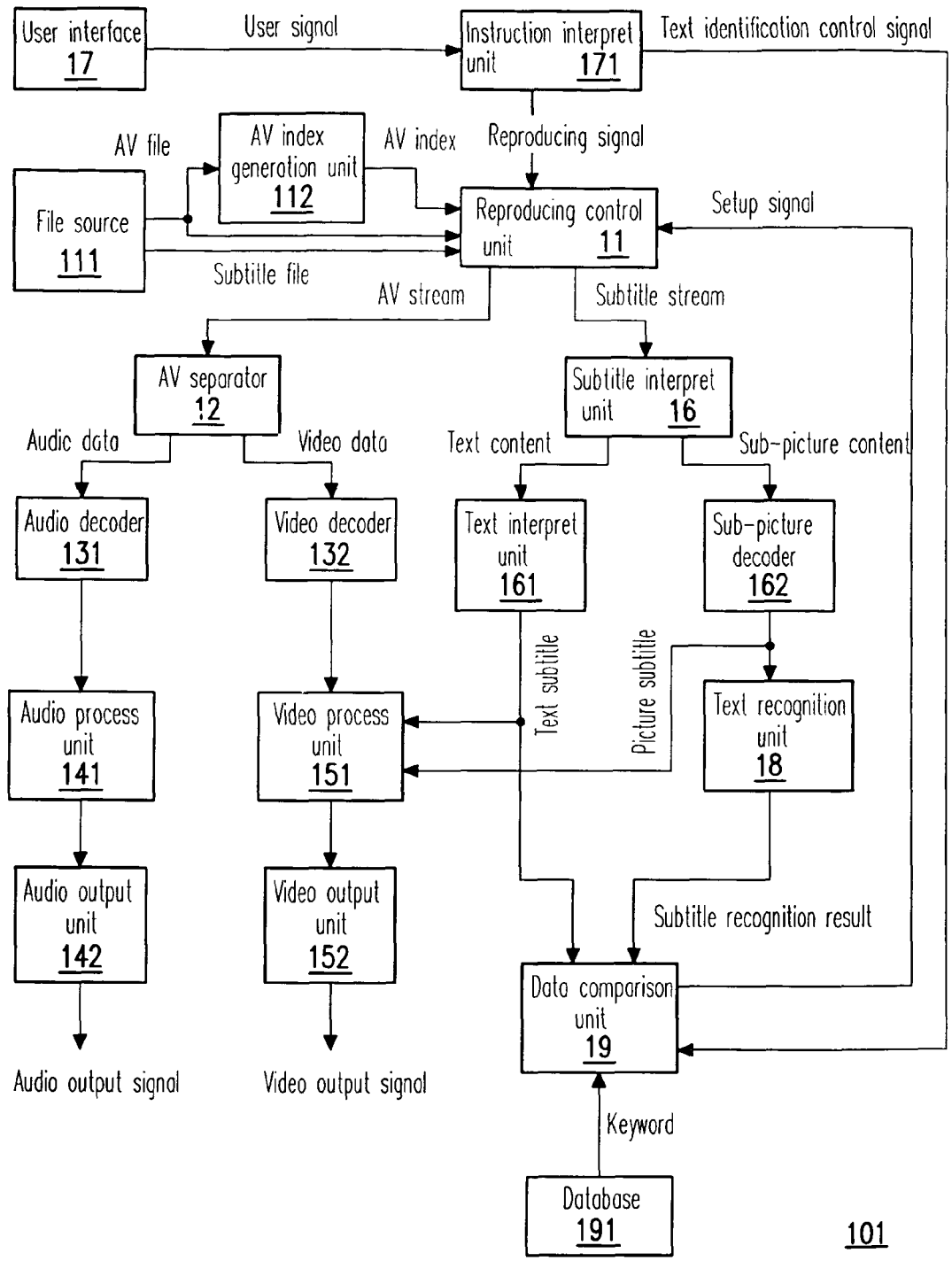
FIG. 2 schematically shows a functional diagram of a digital AV information reproducing apparatus according to a preferred embodiment of the present invention.

FIG. 2 schematically shows a functional diagram of a digital AV information reproducing apparatus 101 according to a preferred embodiment of the present invention.

Referring to FIG. 2, the digital AV information reproducing apparatus 101 comprises: an AV index generation unit 112, a reproducing control unit 11, a user interface 17, an instruction interpret unit 171, an AV separator 12, an audio decoder 131, a video decoder 132, an audio process unit 141, a video process unit 151, an audio output unit 142, a video output unit 152, a subtitle interpret unit 16, a text interpret unit 161, a sub-picture decoder 162, a text recognition unit 18, and a data comparison unit 19. In addition, the digital AV information reproducing apparatus 101 may further comprise a database 191 if required.

Both of the AV file and the subtitle file are provided by a file source 111. Wherein, the AV file is a file-based AV file (e.g. a MPEG4 file), and the subtitle file is a commonly seen .srt file. The file source 111 may be an optical storage media or any other similar storage media. The subtitle file comprises text contents or sub-picture contents. A MPEG4 file is exemplified herein, and usually it is an AV file (.avi file) cooperated with more than one plug-in subtitle (wherein the plug-in subtitle may be in various formats, and the most popular one is the .srt file). In addition, some MPEG4 file may have subtitle embedded in it (e.g. both the subtitle and the AV are contained in the .avi file).

Usually, the built-in subtitle is an original information similar to bitmap, and the plug-in subtitle may be in various formats, even though they are almost stored in a text format (wherein the start and end points for displaying the subtitle are stored). Of course, some other type of plug-in subtitle may be stored with the original information similar to bitmap.

Under normal situation, only one subtitle is selected among the subtitle files to display, and the user can select and switch among various subtitles.

The AV index generation unit 112 generates an "AV index" based on the AV file read from the file source 111, and the AV index is provided to the reproducing control unit 11. Here, the AV index indicates a relationship of a specific reproducing time to a specific logical address of the AV file. For example, the logical address "A6000" is corresponded to a reproducing time of 00:04:57. By using the AV index, it is possible to reproduce the AV information from a desired time point when reproducing a file-based digital AV file.

In response to the user input, the user interface 17 generates and provides a user signal to the instruction interpret unit 171. Wherein, the user signal at least comprises a reproducing signal or a text identification control signal, or a combination of both.

The instruction interpret unit 171 recognizes whether the user signal is the reproducing signal or the text identification control signal. When the user presses the simple function key, such as the rewind key, the fast play key, or the slow play key, a reproducing signal is generated by the instruction interpret unit 171. When a meaningful text is input by the user, the instruction interpret unit 171 generates the text identification control signal or a combination of the text identification control signal and the reproducing signal. The purpose for the user to input the meaningful text is that the time point corresponding to the text (subtitle) may be used to control the start and end points of the AV reproducing. In addition, the text (subtitle) may be compared with the database, such that statistic information used for analyzing the AV file is generated. In addition, the method of combining the time corresponding to text (subtitle) in order to control the AV reproducing allows the user to select the reproducing of some user-defined program by inputting a meaningful text. Furthermore, the method can analyze the characteristic of the AV file (e.g. the complexity of the subtitle, and the classification of the movie) before reproducing the AV file.

The instruction interpret unit 171 provides the reproducing signal to the reproducing control unit 11, and the instruction interpret unit 171 provides the text identification control signal to the data comparison unit 19.

Since the user signal may be either a reproducing signal or a combination of the text identification control signal and the reproducing signal, there are two different operations for the digital AV information reproducing apparatus 101, and these two different operations are described in great detail hereinafter.

User Signal is Reproducing Signal

The operation of the digital AV information reproducing apparatus 101 when the user signal is a reproducing signal is described below. In such case, the digital AV information reproducing apparatus 101 is operated in a normal reproducing mode.

First, the reproducing control unit 11 separates the AV file and the subtitle file into an AV stream and a subtitle stream. Wherein, the AV stream is fed into the AV separator 12, and the subtitle stream is fed into the subtitle interpret unit 16.

Then, the AV separator 12 separates the AV stream into an audio data and a video data. The audio data is fed into the audio decoder 131, the audio process unit 141, and the audio output unit 142, and the audio output unit 142 outputs an audio output signal. Here, the configuration of the components 131, 141, and 142 are not necessarily limited. Alternatively, the components 131, 141, and 142 may be combined to form an "audio process module". The video data is fed into the video decoder 132, the video process unit 151, and the video output unit 152, ant the video output unit 152 outputs a video output signal. Here, the configuration of the components 132, 151, and 152 are not necessarily limited. Alternatively, the components 132, 151, and 152 may be combined to form a "video process module".

The subtitle interpret unit 16 interprets the subtitle stream into either a text content or a sub-picture content. The text content is fed into the text interpret unit 161, and the sub-picture content is fed into the sub-picture decoder 162.

When the text interpret unit 161 is interpreting the text, the required text is extracted and the unnecessary information (e.g. the time information) is cleared. The text interpret unit 161 provides the interpreted text subtitle to the video process unit 151.

The sub-picture decoder 162 processes the sub-picture content into a picture subtitle with a bitmap format. The picture subtitle is then provided to the video process unit 151. The video process unit 151 combines the video data and one of the text subtitle and the picture subtitle into a complete picture. To be noted, in normal operation, the subtitle interpret unit 16 only can output either the text content or the sub-picture content at a time. In other words, the subtitle stream may only contain the text content and not contain the sub-picture content. Alternatively, the subtitle stream may only contain the sub-picture content and not contain any text content. However, the present invention can process all of these cases.

User Signal is Combination of Text Identification Control Signal and Reproducing Signal The operation of the digital AV information reproducing apparatus 101 when the user signal is a combination of the text identification control signal and the reproducing signal is described below. In such case, the digital AV reproducing apparatus 101 is operated in a specific reproducing mode where both the audio and video reproducing modes are turned off until the matched subtitle is found. Afterwards, the operation returns to the normal reproducing mode, and the AV is reproduced from the time point corresponding to the subtitle.

The text identification control signal at least comprises a meaningful text input by the user (i.e. a text to be searched on the subtitle by the user, also known as a text to be searched). The instruction interpret unit 171 provides the text identification control signal (the text input by the user) to the data comparison unit 19. The data comparison unit 19 compares the text identification control signal with the text subtitle (interpreted by the text interpret unit 161) and the subtitle recognition result (interpreted by the text recognition unit 18). Here, the configuration of the text recognition unit 18 is not necessarily limited. In addition, the subtitle interpret unit 18, the text interpret unit 161, the sub-picture decoder 162, and the text recognition unit 18 may be combined and called as a subtitle process module.

The comparison technique used in the data comparison unit 19 is not necessarily limited. For example, the database search technique may be applied. When the comparison is completed, the data comparison unit 19 provides a setup signal (including the compared subtitle information) to the reproducing control unit 11. The reproducing control unit 11 may use the AV index and the time information contained in the subtitle as its control basic of reading the AV.

For example, in a case where the user inputs "Garfield" as a condition of reproducing, after the data comparison unit 19 compared and found a specific picture of subtitle containing "Garfield", the data comparison unit 19 provides a setup signal (including the matched "Garfield" subtitle information and the corresponding time point information) to the reproducing control unit 11. Here, it is assumed that the time point corresponding to the "Garfield" subtitle is 01:08:15. The reproducing control unit 11 finds a time point T less than and most close to 01:08:15 based on the AV index. Then, a logical address of the AV file corresponding to the time point T is found. Afterwards, the reproducing control unit 11 continuously performs a background process from the logical address until the AV time point is equal to 01:08:15, then the audio and the subtitle of the picture are both displayed. Meanwhile, the user can watch the AV start from a picture having a subtitle containing "Garfield".

With such method, the function of "using the matched time point of the subtitle to control the AV reproducing by comparing the user-defined search information (e.g. a meaningful text) with the recognized subtitle" is achieved.

In addition, by adding the database 191, the interpreted/recognized subtitle can be compared with the specific database during the AV reproducing. If the comparison is matched, a specific process (e.g. highlight or clear) is immediately applied on the subtitle. Such operation is same as the operation mentioned above, and it is differed in the user does not need to input the text (i.e. the instruction interpret unit 171 does not need to generate the text identification control signal). Instead, the data comparison unit 19 compares the recognized subtitle with the database 191 (e.g. a TOEFL English vocabulary database) during the AV reproducing. If the comparison is matched, a setup signal is sent back to the reproducing control unit 11, and the reproducing control unit 11 performs the specific process immediately on the subtitle which is currently to be displayed. For example, the reproducing control unit 11 controls the backend video process module to perform the process such as highlight or clear on the text subtitle or the picture subtitle containing the keyword.

In addition, the user is allowed to input a question complied with English grammar, and the question is analyzed in order to find out all possible keywords, which is then used as the specific keyword to be searched later. Accordingly, the user convenience is improved and the user interaction function is enhanced.

Figure 3:
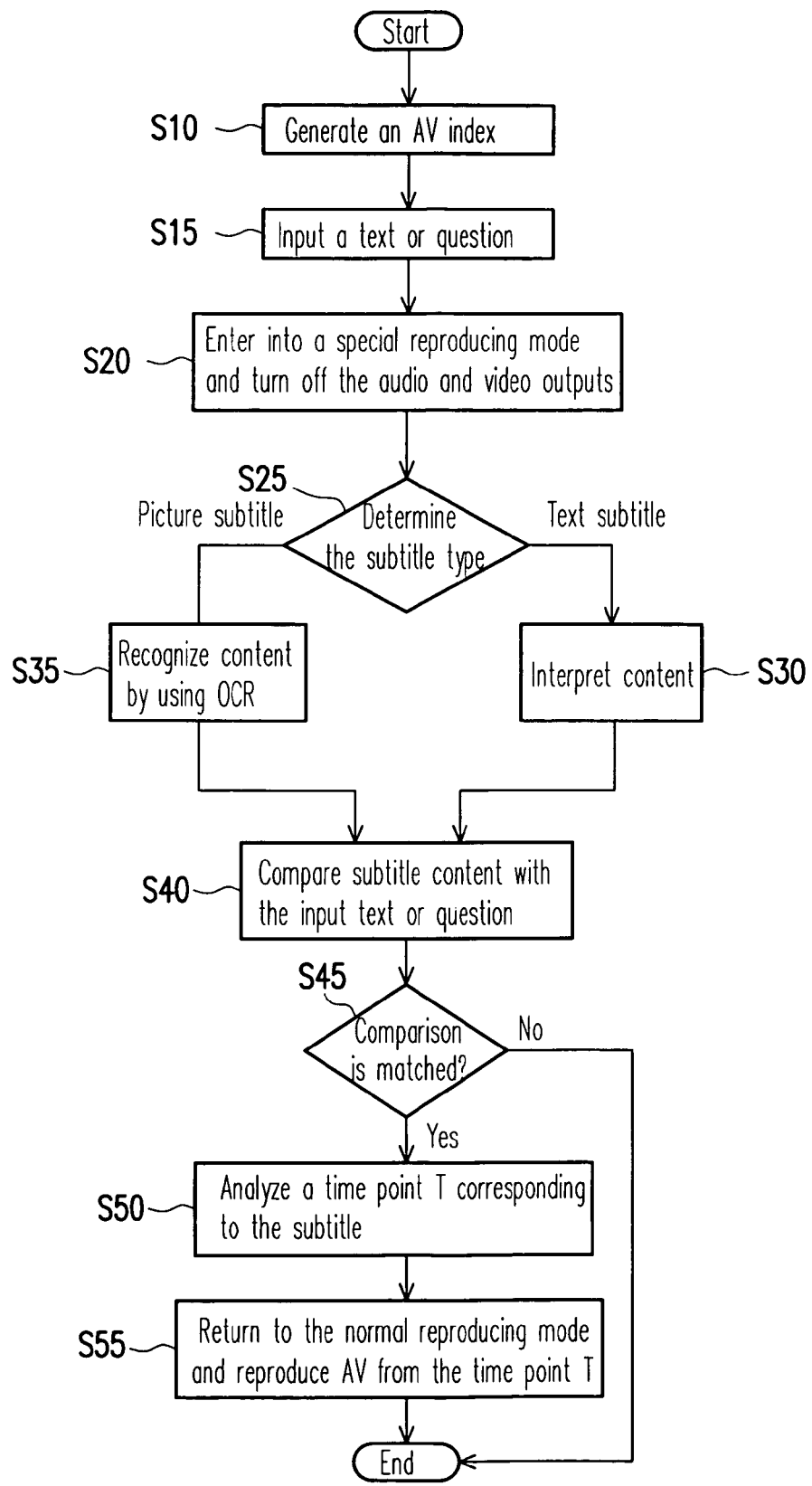
FIG. 3 schematically shows a flow chart illustrating a method for controlling a file-based AV file according to a preferred embodiment of the present invention.

FIG. 3 schematically shows a flow chart illustrating a method for controlling a file-based AV file according to a preferred embodiment of the present invention. With such controlling method, it is possible to jump to a picture of the subtitle having "a text or question input by the user" during reproducing the file-based AV file.

Referring to FIG. 3, first, in step S10, the digital AV file is analyzed in order to generate an "AV index".

In step S15, a specific text or question is input by the user.

In step S20, the operation enters into a special reproducing mode where both the audio and video outputs are turned off.

In step S25, the type of subtitle is determined, that is to determine whether the content contained in the subtitle file is either a text or a sub-picture. If it is the text subtitle, the process goes to step S30. If it is the picture subtitle, the process goes to step S35.

In step S30, the content of the text subtitle is interpreted.

In step S35, the content of the picture subtitle is recognized by the OCR.

In step S40, the interpreted/recognized subtitle content is compared with the text or question input by the user.

In step S45, it is to determine whether the comparison is matched or not. That is to determine whether the subtitle content contains the text or question input by the user or not.

If it is matched, in step S50, the reproducing time point T corresponding to the subtitle is analyzed.

In step S55, the operation returns to a normal reproducing mode to reproduce the AV file from the time point T.

In the processes mentioned above, step S10 and step S15 may be swappable with each other.

In summary, in the optical disk reproducing apparatus and the method controlling the same provided by the present invention, even when reproducing a digital AV file not containing the system layer information, the digital AV file can be reproduced from any time point by generating an "AV index". In addition, a matched time point corresponding to the subtitle is found by comparing the subtitle content with the text input by the user, and the picture of the subtitle having the text input by the user can be reproduced from that specific time point.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A digital audio-video (AV) information reproducing apparatus for reproducing a file-based AV file, comprising:

an instruction interpret unit generating a reproducing signal in response to a user signal, wherein the instruction interpret unit generates a text identification control signal if the user signal containing a text to be searched;

an AV index generation unit for analyzing the AV file and generating an AV index, wherein the AV index records relationship of a predetermined time point to a specific logical address of the AV file;

a reproducing control unit, connected to the instruction interpret unit and the AV index generation unit, for receiving the reproducing signal, the AV file, and the AV index;

a subtitle process module, connected to the reproducing control unit, for processing a subtitle stream outputted from the reproducing control unit; and a data comparison unit, connected to the subtitle process module and the instruction interpret unit, for comparing output of the subtitle process module with the text identification control signal, and providing a setup signal indicating a comparison result including the predetermined time point to the reproducing control unit when the user signal contains the text identification control signal;

wherein, the reproducing control unit searches and reproduces a matched part of the AV file corresponding to the predetermined time point based on the AV index and the predetermined time point.

2. The digital AV information reproducing apparatus of claim 1, wherein, the reproducing control unit further receives a subtitle file, and the reproducing control unit searches and reproduces a matched part of the subtitle file corresponding to the predetermined time point; and the reproducing control unit interprets the AV file and the subtitle file into an AV stream and the subtitle stream.

3. The digital AV information reproducing apparatus of claim 2, further comprising:

an AV separator, connected to the reproducing control unit, for separating the AV stream into an audio data and a video data;

an audio process module for processing the audio data into an audio output signal; and a video process module for processing the video data and the output of the subtitle process module to a video output signal.

4. The digital AV information reproducing apparatus of claim 3, wherein when the setup signal indicates the comparison is matched, the reproducing control unit searches the AV index based on the setup signal in order to search and reproduce a matched part of the AV file and the subtitle file containing the text to be searched.

5. The digital AV information reproducing apparatus of claim 3, further comprising a database for providing a keyword to the data comparison unit, wherein the data comparison unit compares the keyword with the output of the subtitle process module, and sends the setup signal indicating the comparison result back to the reproducing control unit;

wherein, the reproducing control unit controls the video process module to process the output of the subtitle process module containing the keyword based on the setup signal indicating the comparison is matched.

6. The digital AV information reproducing apparatus of claim 1, wherein the subtitle process module comprises:

a subtitle interpret unit, connected to the reproducing control unit, for interpreting the subtitle stream into either a text content or a sub-picture content;

a text interpret unit, connected to the subtitle interpret unit, for interpreting the text content into a text subtitle;

a sub-picture decoder, connected to the subtitle interpret unit, for decoding the sub-picture content into a picture subtitle; and a text recognition unit, connected to the sub-picture decoder, for recognizing the picture subtitle into a subtitle recognition result;

wherein the data comparison unit compares the text identification control signal with either the text subtitle or the subtitle recognition result, and sending the setup signal indicating a comparison result back to the reproducing control unit.

7. A digital audio-video (AV) information reproducing apparatus for reproducing a file-based AV file, comprising:

a reproducing control unit for analyzing the AV file and a subtitle file and generating an AV stream and a subtitle stream;

an instruction interpret unit, connected to the reproducing control unit, for replying a user signal and generating a text identification control signal and a reproducing signal, and the reproducing signal is fed into the reproducing control unit;

an AV index generation unit, connected to the reproducing control unit, for analyzing the AV file and providing an AV index to the reproducing control unit, wherein the AV index records relationship of a predetermined time point to a specific logical address of the AV file;

a subtitle process module, connected to the reproducing control unit, for processing the subtitle stream into either a text subtitle or a subtitle recognition result; and a data comparison unit, connected to the instruction interpret unit and the subtitle process module, for comparing the text identification control signal with either the text subtitle or the subtitle recognition result;

wherein, when the user signal contains a predetermined time point, the reproducing control unit searches and reproduces a matched part of the AV file and the subtitle file corresponding to the predetermined time point based on the AV index and the predetermined time point; and when the user signal contains a text to be searched, the data comparison unit sends a setup signal indicating the comparison result back to the reproducing control unit, and the reproducing control unit searches the AV index based on the setup signal in order to search and reproduce a matched part of the AV file and the subtitle file containing the text to be searched.

8. The digital AV information reproducing apparatus of claim 7, further comprising:

an AV separator, connected to the reproducing control unit, for separating the AV stream into an audio data and a video data.

9. The digital AV information reproducing apparatus of claim 8, further comprising:

an audio process module, connected to the AV separator, for processing the audio data into an audio output signal; and a video process module, connected to the AV separator, for processing the video data and alternative of the text subtitle and the picture subtitle into a video output signal.

10. The digital AV information reproducing apparatus of claim 7, wherein the subtitle process module comprises:

a subtitle interpret unit, connected to the reproducing control unit, for interpreting the subtitle stream into either a text content or a sub-picture content;

a text interpret unit, connected to the subtitle interpret unit, for interpreting the text content into the text subtitle;

a sub-picture decoder, connected to the subtitle interpret unit, for decoding the sub-picture content into a picture subtitle; and a text recognition unit, connected to the sub-picture decoder, for recognizing the picture subtitle into the subtitle recognition result.

11. The digital AV information reproducing apparatus of claim 7, further comprising a database, connected to the data comparison unit, for providing a keyword to the data comparison unit, wherein the data comparison unit compares the keyword with either the text subtitle or the subtitle recognition result, and sends the setup signal indicating the comparison result back to the reproducing control unit;

wherein, the reproducing control unit controls the video process module to process alternative of the text subtitle and the picture subtitle containing the keyword based on the setup signal indicating the comparison is matched.

* * * * *